No. 846,095. PATENTED MAR. 5, 1907.
F. W. DICK.
INDICATOR FOR OVERHEATED SHAFT BEARINGS AND THE LIKE.
APPLICATION FILED DEC. 9, 1905.

5 SHEETS—SHEET 1.

No. 846,095. PATENTED MAR. 5, 1907.
F. W. DICK.
INDICATOR FOR OVERHEATED SHAFT BEARINGS AND THE LIKE.
APPLICATION FILED DEC. 9, 1905.

5 SHEETS—SHEET 2.

No. 846,095. PATENTED MAR. 5, 1907.
F. W. DICK.
INDICATOR FOR OVERHEATED SHAFT BEARINGS AND THE LIKE.
APPLICATION FILED DEC. 9, 1905.
5 SHEETS—SHEET 3
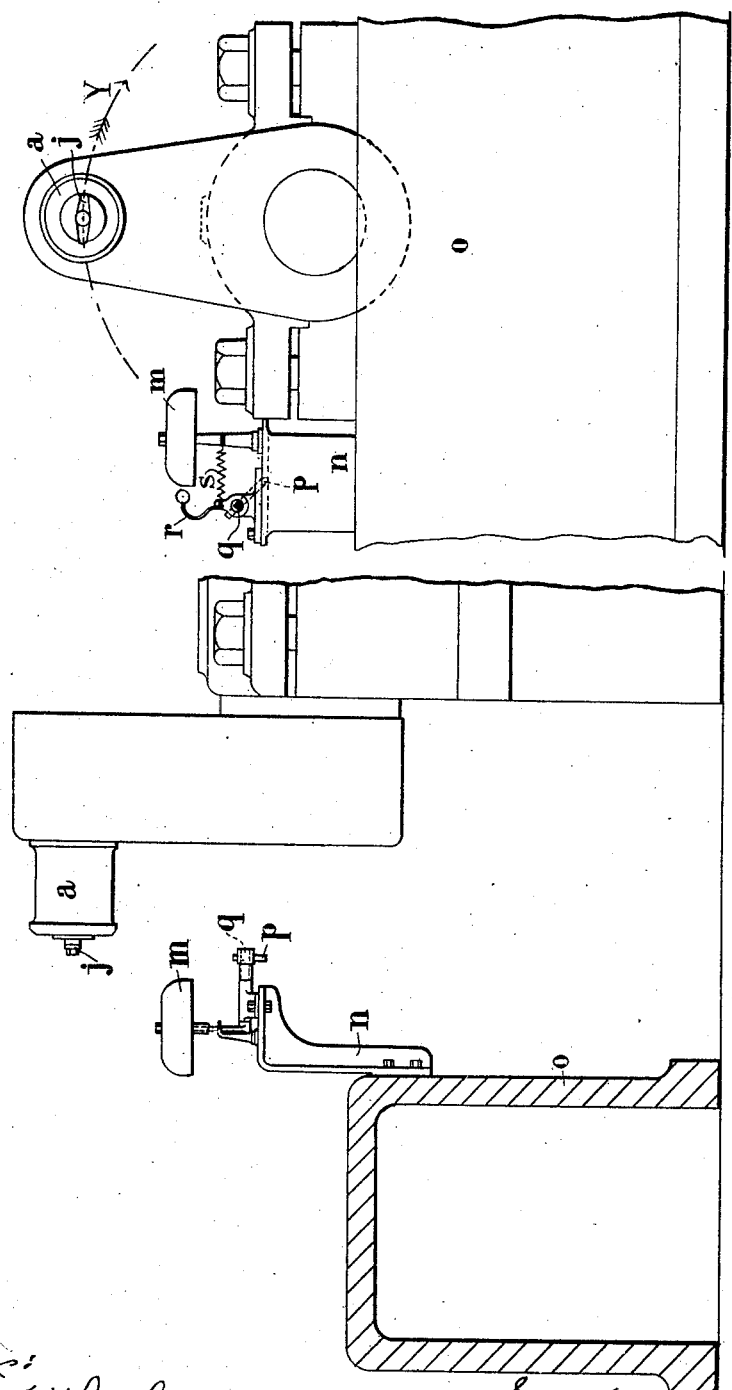

No. 846,095. PATENTED MAR. 5, 1907.
F. W. DICK.
INDICATOR FOR OVERHEATED SHAFT BEARINGS AND THE LIKE.
APPLICATION FILED DEC. 9, 1905.
5 SHEETS—SHEET 4.
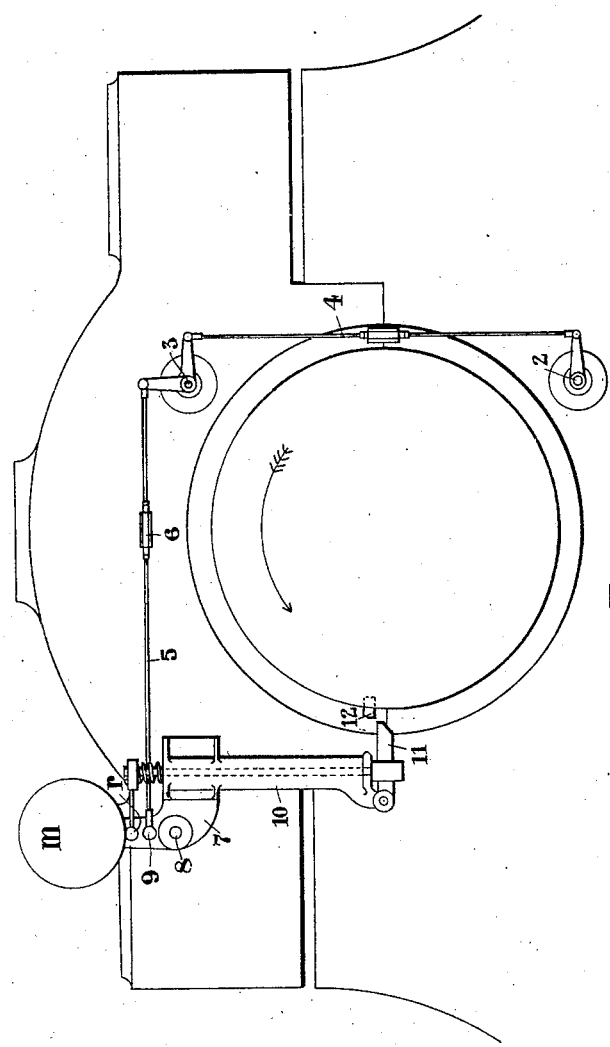

No. 846,095. PATENTED MAR. 5, 1907.
F. W. DICK.
INDICATOR FOR OVERHEATED SHAFT BEARINGS AND THE LIKE.
APPLICATION FILED DEC. 9, 1905.

5 SHEETS—SHEET 5.

UNITED STATES PATENT OFFICE.

FRANK WESLEY DICK, OF ROTHERHAM, ENGLAND.

INDICATOR FOR OVERHEATED SHAFT-BEARINGS AND THE LIKE.

No. 846,095.      Specification of Letters Patent.      Patented March 5, 1907.

Application filed December 9, 1905. Serial No. 291,153.

*To all whom it may concern:*

Be it known that I, FRANK WESLEY DICK, a subject of the King of Great Britain and Ireland, and residing at Park Gate Ironworks, Rotherham, in the county of York, England, have invented certain new and useful Improvements in Improved Indicators for Overheated Shaft-Bearings and the Like, of which the following is a specification.

This invention relates to means for indicating to the caretakers that shaft-bearings or the like are overheated; and its object is to provide a device which shall perform this function efficiently whenever a predetermined temperature is reached.

The invention consists in employing an expansion-thermostat subjected to the heating action of a shaft or the like for effecting the operation of an alarm or indicator, or both, at a predetermined temperature.

The invention also consists in the improved devices hereinbefore described for actuating alarms or indicators for the overheating of shaft-bearings or the like.

Figure 1:
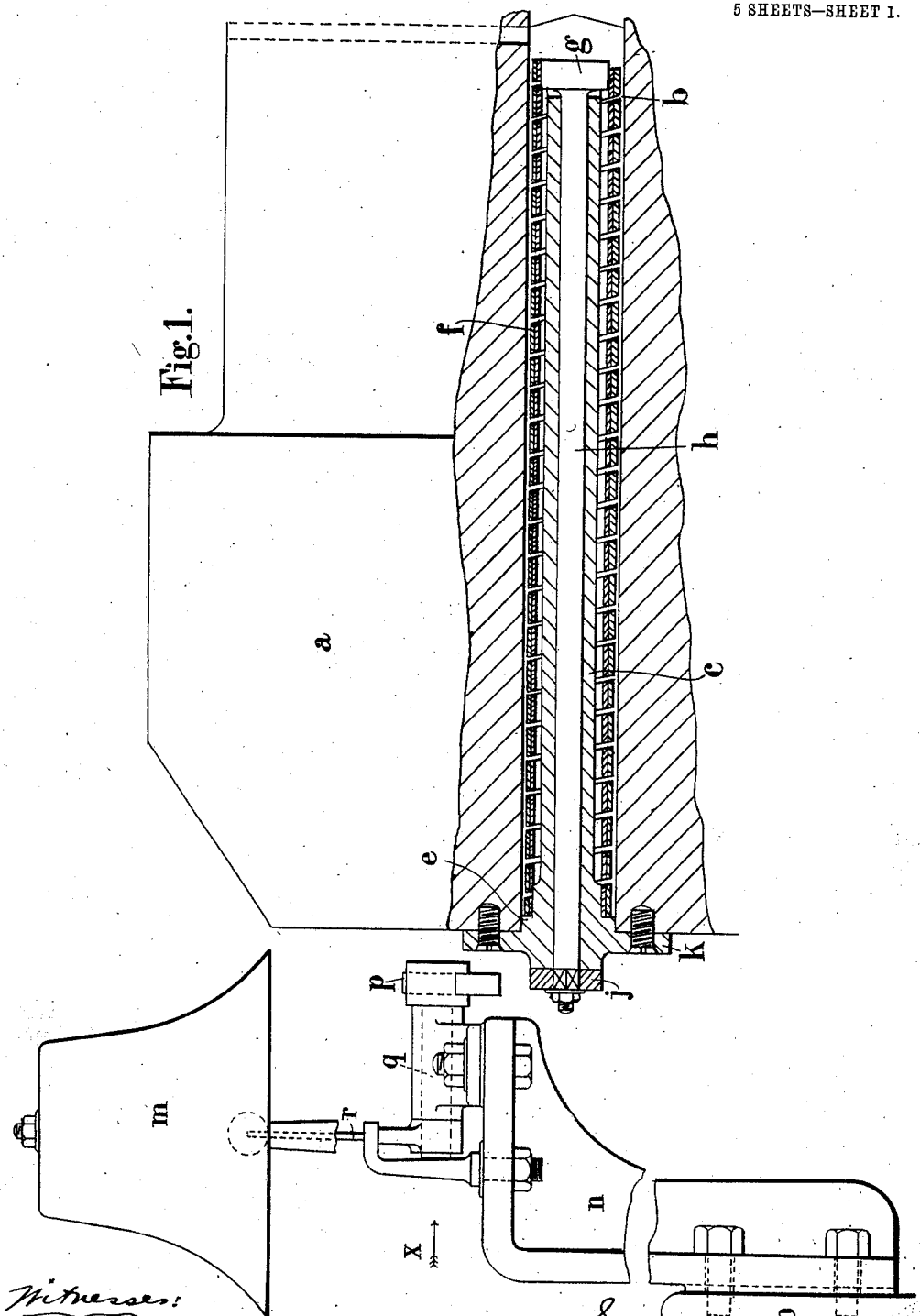
Figure 2:
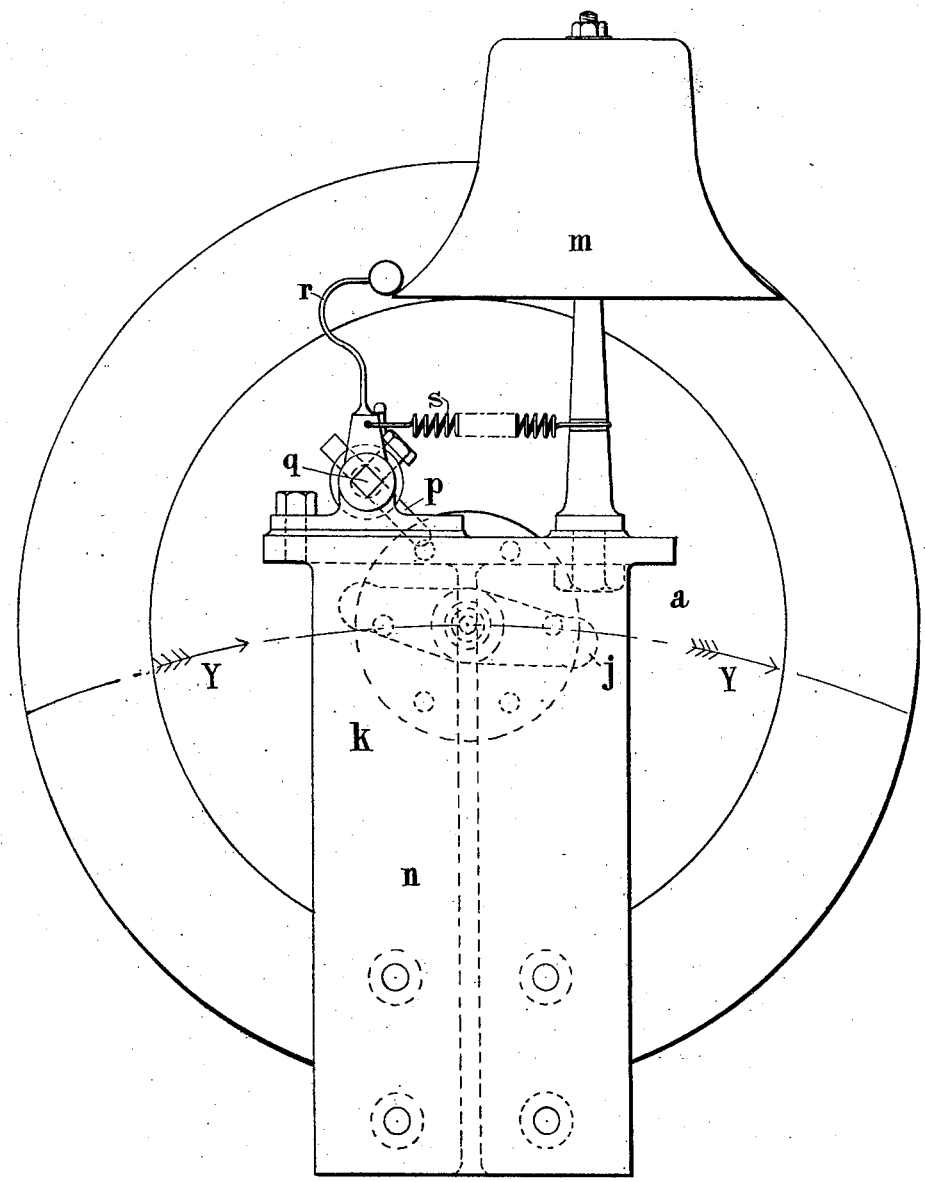
Figure 6:
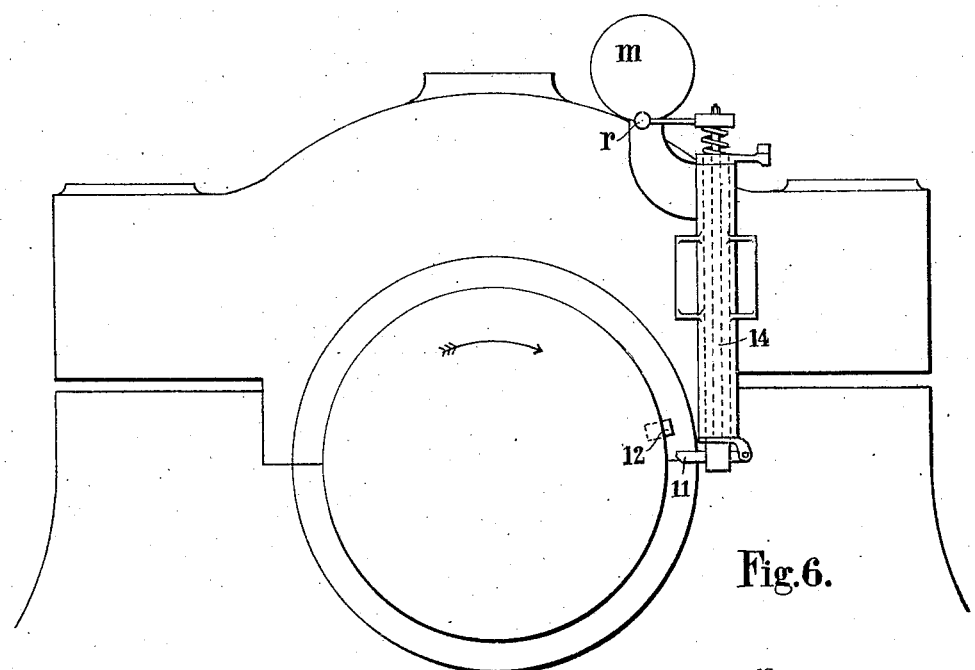
Figure 7:
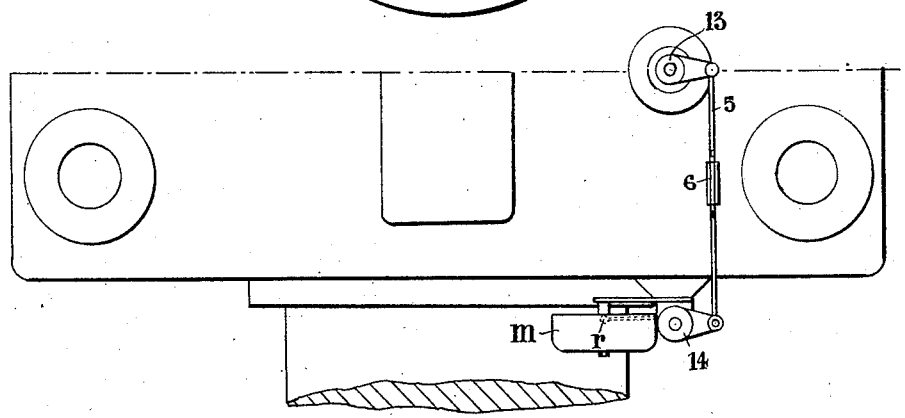

Referring now to the accompanying drawings, which form part of my specification, Figure 1 is a section through a crank-pin having my improved "overheat-indicator" applied. Fig. 2 is an elevation looking in the direction of the arrow X in Fig. 1. Figs. 3 and 4 are elevations showing the method of applying the device illustrated in Figs. 1 and 2 to the crank-pin of a single-throw crank. Fig. 5 illustrates one method of applying my overheat-indicator to shaft-bearings. Figs. 6 and 7 show a modified form of shaft-bearing overheat-indicator.

In carrying my invention into effect according to the form illustrated in Figs. 1 and 2 as applied to the crank-pin of a double-throw crank the crank-pin $a$ has a central hole $b$ drilled in it for some distance. In this central hole there is placed a differential expansion device such as is commonly used in the well-known Breguet thermometer. The construction of this device is as follows: A tubular piece $c$ has fixed to it at the end $e$ a band $f$, composed of two metals of different expansibility, soldered or otherwise fixed together. The band $f$ is wound around the tubular piece $c$ in the form of a spiral and at the other end is attached to a head $g$, formed on a rod $h$, which passes out through the tubular piece $c$ and carries a striker $j$. The tubular piece $c$ is fixed to the crank-pin by means of bolts or pins passing through a flange $k$, and the rod $h$ is held normally from rotating by means of the band $f$, consisting of the two metals of different expansibility. The operation of this part of my overheat-indicator is as follows: If the metal of lower expansibility is inside the spiral formed by the band $f$, when the temperature of the crank-pin rises, owing to heating, the inside metal will not expand so much as the outside metal, thereby causing a "winding up" of the band $f$, and in consequence a small amount of rotation will be transmitted to the rod $h$ and striker $j$. On the other hand, if the metal of lower expansibility is outside the spiral band a rise of temperature will cause an unwinding of the band. This movement of the striker is utilized when the temperature of the shaft has reached a certain amount to sound a gong or bell $m$, carried by a bracket $n$, fixed to the bed-plate $o$ of the engine or the like, as shown in Figs. 1, 2, 3, and 4. The striker $j$, when the required amount of rotation has been given to it by the action of the band $f$, comes into the path of a tongue $p$, carried by a shaft $q$, which also carries the hammer $r$ of the gong. A spring $s$ normally holds the hammer and tongue in their correct inoperative positions. The relative positions of the various parts are shown for a rotation in the direction indicated by the arrow Y in Fig. 2.

As seen in Figs. 3 and 4, the bracket is placed on one side of the crank-shaft, so that in the rotation of the crank the striker $j$ when rotated to the required position is brought into engagement with the tongue $p$ of the bell-ringing device. The amount by which the tongue $p$ projects is adjustable, and by altering the amount of projection of the tongue the temperature at which the device operates—*i. e.*, the alarm sounds—may be varied.

In Fig. 5 the device is shown applied to a shaft-bearing. Two devices 2 and 3, similar to that described with reference to Figs. 1 and 2, are located in holes drilled in the bearing-block in close proximity to the working surfaces, so that the metal band is subjected to the temperature of the shaft. These two devices are coupled by a rod 4, while the upper device 3 is provided with a bell-crank lever connected by a rod 5, having an adjustable screw 6 provided on it. The rod 5 is arranged to operate the bell-ringing mechanism. In the form seen in Fig. 5 the bracket 7, carrying the bell and hammer, is pivoted about the point 8, while the rod 5 is connected to the bracket at the point 9. An extension 10 carries a trigger 11, adapted by the action of the spiral-band devices 2 and 3 to be brought into the path of a knob 12, carried by the shaft. The trigger 11 is spring-controlled and when struck operates the hammer, which rings the bell or gong to give the alarm. It is evident that I may dispense with one of the devices 2 or 3 or I may add a third, suitable couplings being arranged in each of these cases to effect the operation of the bell devices.

In Figs. 6 and 7 a modification is shown in which the two-metal band device 13 is placed at right angles to the positions shown in Fig. 3. In this case a rotary motion is transmitted from the device 13 to a vertical spindle 14, which carries the tongue or trigger 11. The rest of the mechanism is substantially similar to that shown in Fig. 5. The adjusting-nut 6 in each of these two modifications enables the position of the trigger to be accurately determined, so that no alarm will be given till the temperature reaches the predetermined amount at which it is desired the bell shall be rung. It will be evident that the closer the striker or trigger 11 is arranged to the knob 12 the smaller will be the rise in temperature necessary to operate the alarm. Instead of ringing a bell by mechanical means as described the motion of the striker j or the levers may be used to close an electric switch, and thereby cause the ringing of an electric bell or buzzer.

Having now described my invention, what I claim as new, and desire to secure by Letters Patent, is—

1. The combination with a bearing, of a metallic ribbon composed of two metals of different expansibility bound together and wound in a spiral and subjected to the heating action of the bearing, a tubular element fixed in the bearing and to one end of the metallic ribbon, a central rod, a striker, a tongue-piece coacting at certain predetermined temperature with the striker, and a bell adapted to be sounded when the tongue-piece and the striker coact, substantially as described.

2. The combination with a bearing, of a metallic ribbon composed of two metals of different expansibility bound together and wound in a spiral and subjected to the heating action of the bearing, a tubular element fixed in the bearing and to one end of the metallic ribbon, a central rod, a lever on said central rod, a link connecting said lever to a pivotally-carried bracket, a bell carried by said bracket, a spring-trigger for sounding said bell, and a knob on the shaft adapted to coact with the trigger when the predetermined temperature is reached, substantially as described.

3. The combination with a bearing, of a metallic ribbon composed of two metals of different expansibility bound together and wound in a spiral and subjected to the heating action of the bearing, a tubular element fixed in the bearing and to one end of the metallic ribbon, a central rod, a lever on said central rod, a link connecting said lever to a spindle, a trigger on said spindle, a knob on the shaft adapted to coact with the trigger when the predetermined temperature is reached, and a bell adapted to be sounded when the knob and trigger coact, substantially as described.

4. The combination with a bearing, of a metallic ribbon composed of two metals of different expansibility bound together and wound in a spiral and subjected to the heating action of the shaft-bearing, a tubular element fixed in the bearing and to one end of the metallic ribbon, a central rod, a lever on said central rod, a link connecting said lever to a spindle, an adjusting-screw on said link, a trigger on said spindle, a knob on the shaft adapted to coact with the trigger when the predetermined temperature is reached, and a bell adapted to be sounded when the knob and trigger coact, substantially as described.

5. The combination with a bearing, of an overheat device comprising a Breguet thermostat, a bell, a trigger for sounding said bell controlled by said thermostat, and a striker operated to strike said trigger when said thermostat is overheated.

6. The combination with a fixed part and a rotating part, of an overheat-indicator comprising a striker on one of said parts to operate the bell of said indicator, a Breguet thermostat, a bracket carrying said bell and the trigger to sound the latter, and said bell and trigger, said bracket being controlled by said thermostat to throw said trigger into the path of said striker.

7. The combination with a bearing, of an overheat device, comprising a Breguet thermostat, a bell with a clapper and means for actuating the same lying normally out of the path of a striker, a device connected to said thermostat and adapted to throw said means into position for engagement with said striker, and the striker aforesaid lying normally out of engagement with said means but adapted to engage the same when the thermostat is overheated.

In testimony whereof I have signed my name to this specification in the presence of two subscribing witnesses.

FRANK WESLEY DICK.

Witnesses:
  LUTHER J. PARR,
  CHAS. C. DANIELS.